United States Patent [19]

Hardway, Jr.

[11] 3,774,238

[45] Nov. 20, 1973

[54] THREE-TERMINAL CAPACITIVE APPARATUS FOR REMOTELY RESPONDING TO A CONDITION OR DIELECTRIC PROPERTIES OF A MATERIAL

[75] Inventor: Edward V. Hardway, Jr., Houston, Tex.

[73] Assignee: Spearhead, Inc., Houston, Tex.

[22] Filed: Dec. 9, 1971

[21] Appl. No.: 206,463

[52] U.S. Cl............. 324/61 R, 73/304 C, 137/392, 340/258 C, 340/244 C
[51] Int. Cl........................................... G01r 27/26
[58] Field of Search........................ 324/61 R, 61 P; 73/304 C, 398 C; 340/258 C, 244 C; 137/392, 386

[56] References Cited
UNITED STATES PATENTS

| 3,519,923 | 7/1970 | Martin | 324/61 R |
|---|---|---|---|
| 3,161,054 | 12/1964 | Cohn | 73/304 C |
| 3,375,716 | 4/1968 | Hersch | 73/304 C |
| 2,820,987 | 1/1958 | Bunch | 324/61 R |
| 3,486,108 | 12/1969 | Rosica et al. | 324/61 R |
| 3,221,247 | 10/1965 | Samuelian | 324/61 R |
| 3,580,074 | 5/1971 | Wescott et al. | 73/304 C |
| 3,611,126 | 10/1971 | Lucka | 324/61 R |
| 3,684,953 | 8/1972 | Grant | 324/61 R |
| 3,037,165 | 5/1962 | Kerr | 324/61 P |

Primary Examiner—Stanley T. Krawczewicz
Attorney—W. F. Hyer et al.

[57] ABSTRACT

Three-terminal capacitive apparatus are disclosed which provide information concerning a condition of a material by responding to the dielectric properties of the material. A three-terminal capacitor, which may be a cell or probe, may be used, for example, to measure the dielectric constant of a material, to determine the level of a material in a container, to determine the interface between liquid materials in a pipeline, or the proximity of a material to the probe. Each cell or probe includes a conductive driven element connected to a regulated square wave source, and a conductive receptor element connected to the input of a high gain amplifier with a capacitor in the feedback loop which maintains the receptor element at virtual ground. The output of the feedback amplifier is proportional to the feed through capacitance of the capacitive probe or cell. A synchronous demodulator, synchronized by the drive signal or a signal in phase with it, is connected to the feedback amplifier output and is used to produce a DC output signal used for display or control. The cell or probe is connected to associated electronics through shielded cables and may be remotely located from the electronics. Suitable mechanical apparatus is associated with a particular three-terminal capacitor cell or probe for mounting it in position to respond to a particular condition being monitored.

14 Claims, 19 Drawing Figures

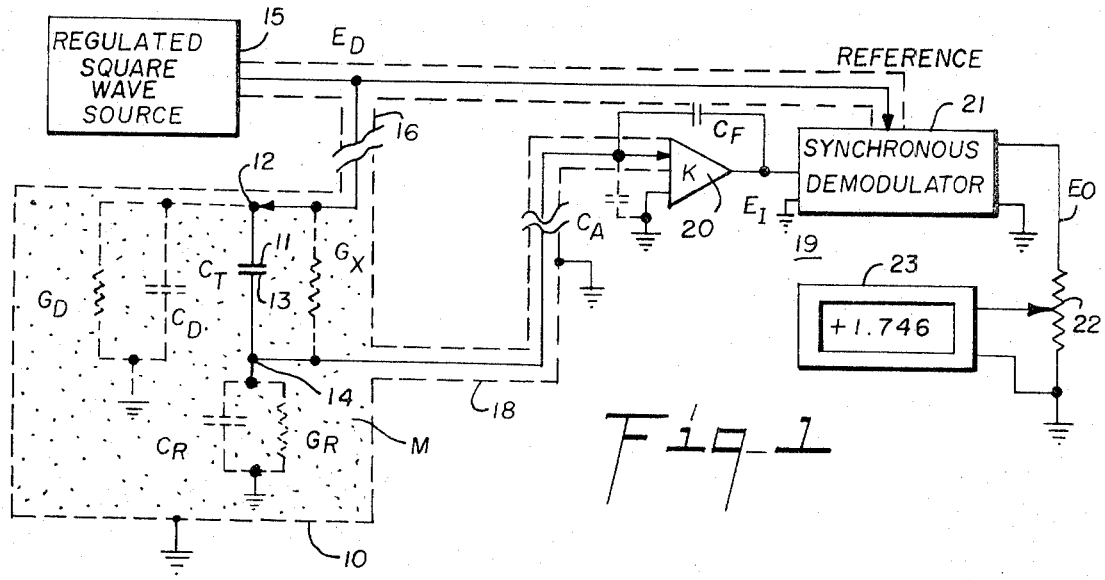
Fig_1
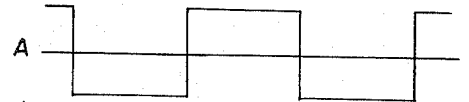
Fig_2A
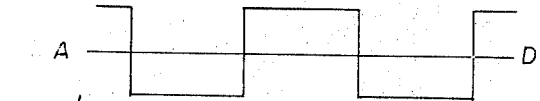
Fig_3A
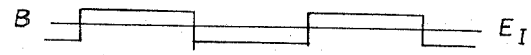
Fig_2B
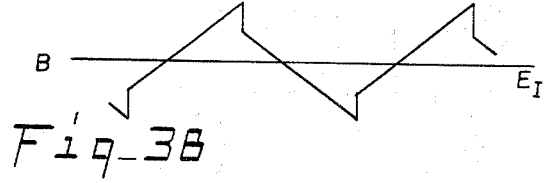
Fig_3B
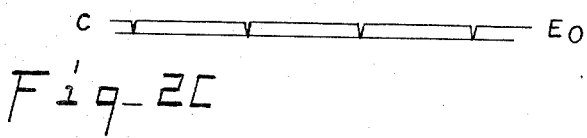
Fig_2C
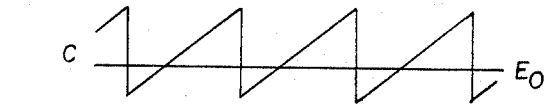
Fig_3C

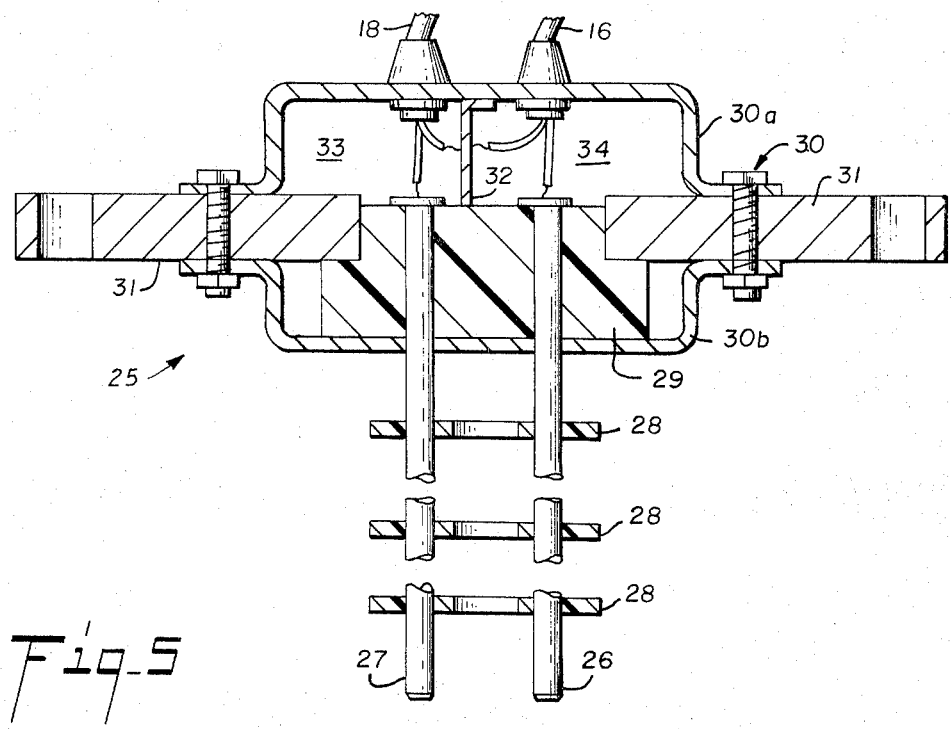
Fig-5
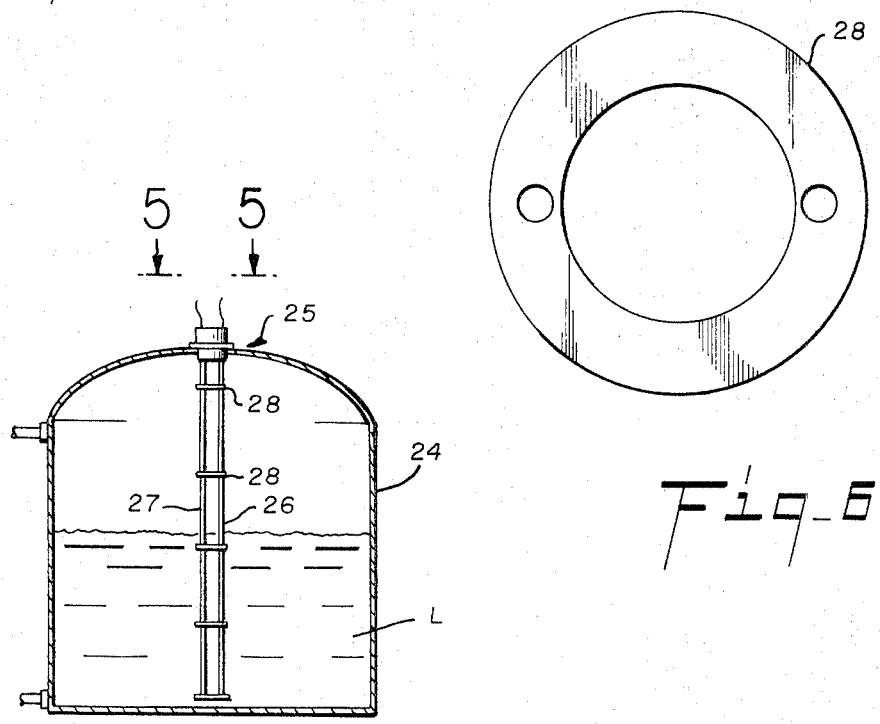
Fig-6
Fig-4

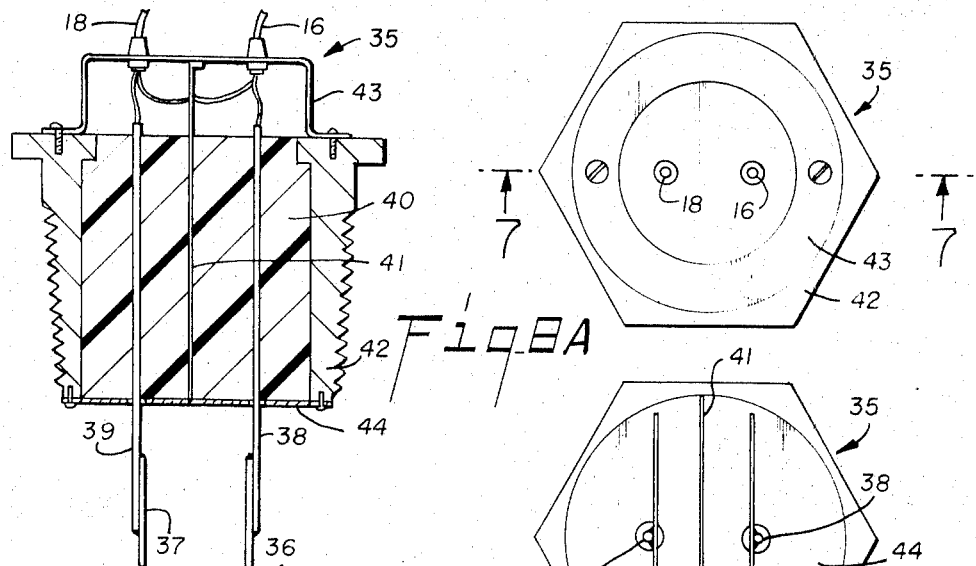
Fig. 7
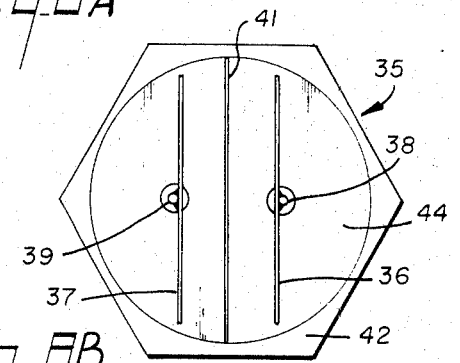
Fig. 8A
Fig. 8B
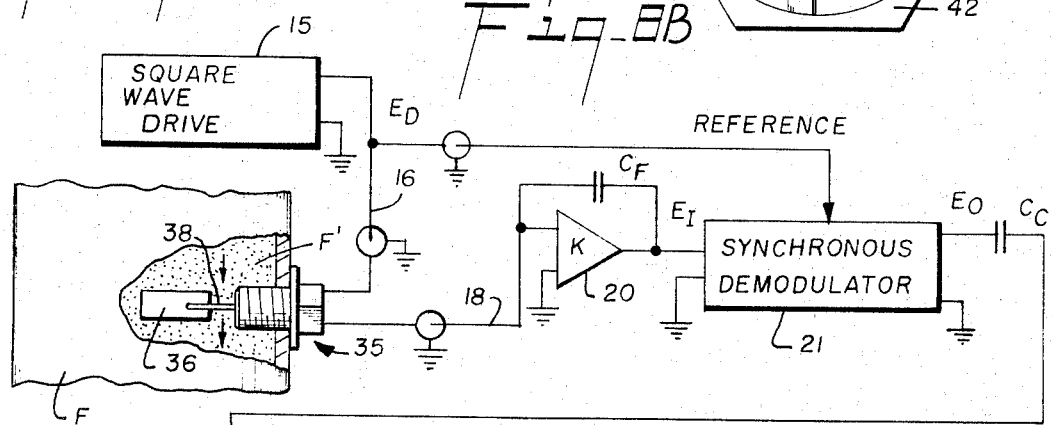
Fig. 9
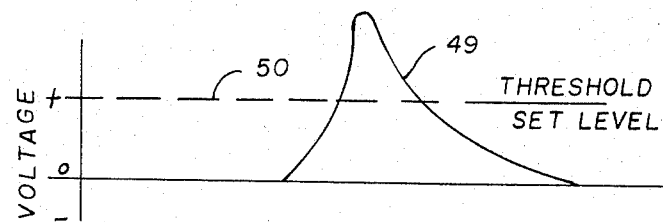
Fig. 10

THREE-TERMINAL CAPACITIVE APPARATUS FOR REMOTELY RESPONDING TO A CONDITION OR DIELECTRIC PROPERTIES OF A MATERIAL

This invention relates to three-terminal capacitive apparatus for remote sensing or measuring applications, and in one of its aspects to three-terminal capacitor cells and probes and associated electronic input and output circuits for use in such apparatus, wherein the feed through capacitance of the cell or probe is a function of the dielectric properties of a material in proximity to or about and between the capacitive elements of the cell or probe.

It is often desirable to use a capacitive device, such as a probe or cell, to determine the dielectric properties, and small changes therein, of a material in proximity to the cell or probe, and in the presence of relatively large cable capacitance and other stray capacitance. In many cases, it is either impractical or impossible to locate the measuring electronic circuits at the point of measurement and remote sensing must be provided for by the apparatus employed.

Examples are in the measurement of level of nonconducting liquids and granular solids in a tank, and the determination of dielectric constant in on-stream process applications for the purpose of measuring or controlling the ingredient ratio or moisture content of the product being processed. In some instances, the detection of a small dielectric change is important, such as when using high and low limit probes to control the level of material in a storage tank or when detecting the appearance of an interface between two liqids flowing in a products pipeline. In the latter case, the dielectric changes and thus changes in feed through capacity of the probe may be extremely small compared to cable and other stray capacitances to ground. Another important industrial application for the detection of small changes in dielectric or conducting properties is that of proximity detection in which the approach or presence of either a conducting object insulated from ground, or the approach or presence of a material of higher or lower dielectric constant in the vicinity of or between the probe elements is detected. Heretofore, in so far as is known to applicant, suitable and relatively inexpensive devices for providing the desired measurement or detection in remote sensing applications such as described have not been available.

For example, in the past, four arm capacitance bridges and tuned resonant circuits with servomechanism balancing means in the indicator or controller have been used in industrial devices for measuring level, moisture content, etc. These have been limited in accuracy and in application by the fact that they employed two-terminal capacitive measuring techniques wherein the capacitance of connecting cables and the stray capacitance to ground were included in the measurement. These capacitances had to be subtracted by the apparatus or in the interpretation of the result. Changes of the cable dielectric with temperature would affect the result and no changes could be made in length or type of cable furnished by the manufacture. Thus, the application to which the device was put was necessarily limited. Also, two-terminal devices which include cable capacitance with the capacitance being sensed are far less suitable for remote sensing applications, particularly where extremely small capacitive changes may be involved.

Some analog and digital capacitance meters which are available measure the current through or voltage across a low value resistance or effective resistance in series with a capacitor connected to a sinusoidal voltage source of precisely controlled amplitude and frequency. However, these instruments develop amplitude and phase errors affecting their output in the presence of either cable capacitance or conductive leakage across the measured capacitor. Any error or changes in frequency directly affect the output.

Three-terminal automatic capacitance bridges which employ phase sensitive detectors to provide a polarized signal to drive a digitally controlled bridge have also been provided. These are insensitive to cable capacitance and shunt resistance or resistance to ground when at balance. Typically, in these devices, a digitally switched variable voltage multiplied by the value of the unknown capacity is balanced against a fixed voltage - reference capacity product. Such bridges are used extensively for the measurement and sorting of capacitors. They are, however, extremely expensive and are unsuited to many industrial applications because of their cost. These devices generally provide a digital indication and output but no analog output.

In utilizing capacitive devices in the industrial applications previously mentioned, in some instances, leakage conductance in the cables or connections may be present. In other cases, the measured material may have some conductance. It is highly desirable to have the measuring apparatus relatively insensitive to conductance between the conductors involved in the measurement, or between any one of them and ground, and previous systems other than automatic bridges for the purposes contemplated by the present invention have not provided any simple and satisfactory means for rendering the measuring apparatus insensitive to conductance.

It is thus an object of this invention to provide capacitive apparatus for continuously measuring or responding to small changes in capacitance caused by a condition of a material, and wherein such capacitive measurements can be made in the presence of cable and shunt capacitance without employing automatic capacitance bridges and phase sensitive detectors.

Another object of this invention is to provide such apparatus which may be used in numerous industrial applications in which the point of measurement is remotely located from electronic apparatus employed.

Another object of this invention is to provide such apparatus which provides for the substantial cancellation of any shunt conductance of the measured material or conductance otherwise present in the measuring apparatus.

Another object of this invention is to provide such apparatus for measuring level of a material in a container, or for determining when the material is above or below a certain point in the container to provide a control or warning signal.

Another object of this invention is to provide such apparatus for measuring dielectric constant of a material to determine moisture content and/or ingredients ratio.

Another object of this invention is to provide such apparatus for determining when the interface between two materials of differing dielectric constant passes by a certain point in a pipeline.

A further object of this invention is to provide such apparatus for determining the approach, presence, or proximity of a dielectric, or conducting object or material.

Another object is to provide such apparatus which can accomplish the above objects while utilizing relatively simple and inexpensive circuit components.

These and other objects of this invention, which will become apparent upon consideration of the descriptions herein and appended claims and drawings are accomplished according to this invention by providing capacitive apparatus including a three-terminal capacitor, which may be a cell or probe, mechanically arranged and mounted to perform a particular function (as hereinafter described in detail). The three-terminal capacitor cell or probe includes a conductive driven element, a conductive receptor element, and a ground or guard terminal shielding the drive and receptor circuits from each other except in the area of interest in the vicinity of or between the capacitor elements. A drive signal source provides a square wave drive signal of closely regulated amplitude to the driven element of the three-terminal cell or probe. The input of a high gain amplifier with a capacitor in a feedback loop is connected to the receptor element through a shielded cable with the latter's shield connected to ground or clamped at virtual ground by a unity gain amplifier. The feedback amplifier with a capacitor in the feedback loop provides an output signal proportional to the feed through capacitance of the cell or probe and maintains the receptor element at virtual ground potential by acting as a very large effective shunt capacitance. The square wave drive source has a low output impedance to make it substantially insensitive to cable length. Thus, both the drive and output circuits may be connected to their respective terminals of the cell or probe by coaxial or shielded cables of varying length, and very small changes in the feed through capacitance of the cell or probe can be detected.

The amplified output of the feedback amplifier is connected to a phase sensitive detector, (or synchronous demodulator) which is also connected to the drive circuit so that it has a reference switching signal substantially in phase with the drive signal. The demodulator provides a polarized direct current output signal which may be amplified or fed directly to an analog or digital indicator, high or low limit detectors, control circuits, etc., depending on the application to which the apparatus of this invention is to be put. The synchronous demodulator not only cancels random noise or signals of other frequencies, but also substantially cancels the effect of conductance between the capacitor elements of the cell or probe.

Various modifications of the three-terminal capacitor described can be made to adapt it to different applications, a number of which are described in detail below. In all such applications, the proximity of a conducting material or a dielectric material to the three-terminal probe or cell causes what may be but a small change in the feed through capacity of the cell or probe, and this change can be accurately measured even in the presence of large cable or other stray capacitances and with connecting cables of varying length so that the probe may be remotely located from the input and output electronics. Also, in all instances, at least three terminal connections are used, i.e., the connection to the driven element, the connection to the receptor element, and the ground or guard connection, and in all instances, only the feed through capacitance between the driven and receptor elements of the cell or probe is measured. The driven and receptor elements and the circuits connected to them are completely guarded or shielded from each other except in the area of the measurement.

In the drawings, wherein like reference numerals are used throughout to represent like parts, and wherein is illustrated preferred embodiments of this invention:

FIG. 1 is a schematic diagram of the three-terminal capacitive apparatus of this invention showing the equivalent circuit of the feed through capacitance, various stray capacitance, and conductance;

FIGS. 2A, 2B and 2C show the wave forms of the drive signal and output signals in the FIG. 1 apparatus without the presence of shunt conductance across the capacitor elements;

FIGS. 3A, 3B and 3C show the same wave forms as FIG. 2, but with the presence of such conductance;

FIG. 4 shows a tank partially filled with a nonconducting liquid with a three-terminal capacitor level probe installed therein;

FIG. 5 is an enlarged view of the probe in FIG. 4;

FIG. 6 is an end view of one of the nonconducting separators used to maintain the spacing between the driven and receptor elements of the probe in FIGS. 4 and 5;

FIG. 7 is a cross-sectional view of a three-terminal capacitor probe for use in measuring the dielectric constant of a material and in detecting sudden changes in dielectric constant of products flowing in a pipeline;

FIGS. 8A and 8B are end views of the probe in FIG. 7;

FIG. 9 is a schematic diagram of an interface detector for use with the probe shown in FIGS. 7 and 8;

FIG. 10 is a wave form diagram relating to the apparatus of FIG. 9;

Figure 11:
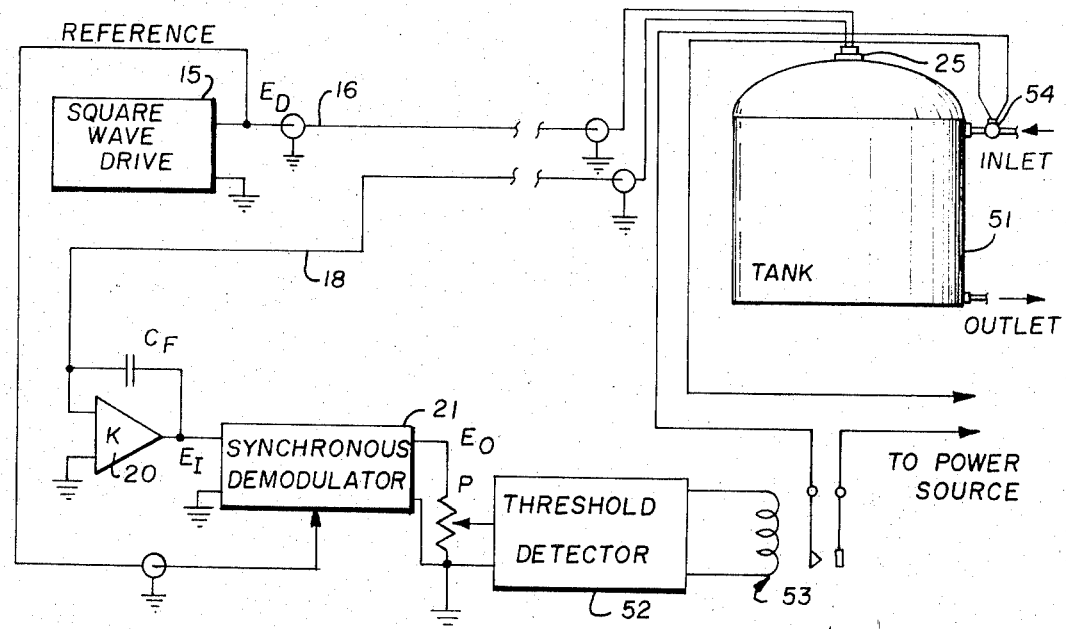
FIG. 11 shows a three-terminal capacitive level control system for maintaining the level of material in a tank.

Referring to the drawings, in FIG. 1, a three-terminal capacitor $C_T$ of capacitance $C_t$, which may be a cell or probe is illustrated as mounted in a shielded and grounded housing 10. For example, housing 10 may be a dielectric cell filled with a material M (shown by dots) the moisture content of which is to be determined. Capacitor $C_T$ includes a driven element 11 connected to a drive terminal 12, and a receptor element 13 connected to a receptor terminal 14. The third terminal of three-terminal capacitor $C_T$ is circuit ground. A drive source 15, which provides a regulated square wave drive signal $E_D$ at its output, is connected at its output by a shielded cable 16 to drive terminal 12 and thus to drive element 11. Receptor terminal 14 (and thus receptor element 13) is connected by a shielded cable 18 to an output circuit 19 which includes a high gain amplifier 20, feedback capacitor $C_F$ of capacitance $C_f$ and a synchronous demodulator 21. The input of amplifier 20, which preferably has a very high gain in the order of 5,000 or greater, is connected to terminal 14 and to a feedback capacitor $C_F$ connected to the output of amplifier 20. This arrangement of amplifier 20 insures that the signal level at terminal 14 will be maintained at or clamped to a very low signal level with respect to the drive signal $E_D$, and preferably at substantially zero signal level, so that the signal level of receptor element 13 is, in effect, at virtual ground. The output of amplifier 20 is connected to an input of synchronous demodulator 21 and another input of demodulator 21 is connected to the output of drive circuit 15. In this manner, when drive signals $E_D$ ar applied to terminal 12, current signals proportional to the feed through capacity of capacitor $C_T$ appear at terminal 14, which is clamped at virtual ground potential by feedback amplifier 20. The amplifier output voltage, $E_I$, of amplifier 20 is equal to the drive voltage $E_D$ multiplied by the capacitance ratio $C_t/C_f$. The voltage $E_I$ is converted to a polarized direct current output voltage $E_O$ at the output of synchronous demodulator 21 synchronized by the drive signal $E_D$. The output of synchronous demodulator 21 can be connected to a scaling potentiometer 22 and to an appropriate analog or digital display or control device, such as the digital display 23 illustrated in FIG. 1.

In actual use, as contemplated by this invention, the elements of probe or cell in housing 10 will be mounted so that the feed through capacitance, $C_t$, between them is affected by the dielectric properties or conductive properties of a material, a condition of which is to be measured or sensed. Several stray values of capacitance and conductance which would normally affect the accuracy of such determinations are shown in FIG. 1. $G_x$ is the conductance in shunt with the capacitor $C_T$ and would normally represent the conductance of the dielectric about and between capacitor $C_T$. $C_R$ and $G_R$ represent capacitance and any conductance between receptor terminal 14 to ground including leakage in grounded shield cable 18. $C_D$ and $G_D$ represent leakage conductance and capacitance from drive terminal 12 to ground or to the grounded shield of cable 16. When long cables 16 and 18 are used $C_R$ and $C_D$ are made up principally of capacitance in the connecting cables. It should be noted that the reference voltage originating in the square wave drive $E_D$ is completely shielded from the low terminal circuit and no capacitance exists between these two except the capacitance between the capacitor elements 11 and 13 in grounded housing 10.

In the embodiment shown in FIG. 1, the regulated square wave drive $E_D$ may typically be a ten kilocycle square wave clipped or regulated by zener diodes to have a precisely determined amplitude. In this embodiment, frequency is not critical. It is important that the output impedance of the regulated square wave drive by very low in comparison with the impedance of the conductance $G_D$ in parallel with the capacitance $C_D$ at the test frequency. The output impedance might typically be 25 to 50 ohms or less resistive. The high gain amplifier 20 with the capacitor $C_F$ in the feedback loop provides a very large effective capacitance ($C_{eff}$) between receptor terminal 14 (and thus receptor element 13) and ground. The value of this effective capacitance is $KC_f$ where K represents the open loop gain of amplifier 20. If the value of $C_f$ is 1,000 picofarads and the gain of amplifier 20 is, for example, 5,000 then the value of $C_{eff}$ will be 5 microfarads. This effective capacitance is large enough to maintain receptor element 13 very close to ground potential or virtual ground. The shunt impedance of $C_R$ and $G_R$ must be very large in comparison with the impedance of the shunt capacitor $C_{eff}$. Generally speaking, the value of $C_{eff}$, which is equal to $KC_f$, must be large compared with the capacitance $C_R$. Usually, the latter will consists principally of cable capacitance. It has been found experimentally that an added capacitor $C_A$ between the terminal 14 and ground also reduces the effect of added cable capacitance. It is believed that this is because the rise time and slew rate limitations of amplifier 20 have less effect when such a capacitor $C_A$ is present to store charge while the amplifier output is, in effect, catching up with the signal on terminal 14. In one test case with a feedback capacitor $C_F$, of 1,000 picofarads and a shunt capacitor $C_A$ with a value of 1,000 picofarads connected between terminal 14 and ground, it was found possible to measure values of $C_t$ to 0.1 percent with or without added cable lengths of up to 30 ft., equivalent to a change in $C_R$ of 900 picofarads. This was accomplished using an operational amplifier with a gain of 50,000, a band width of 3 megacycles, and a slew rate of 10 volts per microsecond for amplifier 20.

Referring to FIG. 2, the wave form represented on line A is that of the square wave drive $E_D$. The wave form represented on line B is the output $E_I$ of amplifier 20 in the absence of any shunt conductance $G_x$. The wave form on line C represents the output $E_O$ of synchronous demodulator 21. The little "blips" or gaps shown are present because of the fact that the rise time and the fall time of amplifier 20 are not instantaneous. If these rise and fall times were instantaneous, and if synchronization were perfect, these blips would not be present and the output of the demodulator would be pure DC. The output signal $E_O$ is reduced by the gaps caused by the limited slew rate and amplifier rise time. The rise time changes proportionally causes no error with changes in amplitude. The slew rate limitation of the amplifier 20 causes some nonlinearity. This effect is reduced by lowering the test frequency. If, however, the frequency is too low, conductance effects as shown in FIG. 3, and later described, will saturate amplifier 20. Since higher slew rate amplifiers are more costly, a compromise must be made to fit the applications.

In FIG. 3, on line A, the square wave drive $E_D$ is identical to that shown in FIG. 2, line A. The wave form on line B of FIG. 3 is the same as that on line B of FIG. 2 with the exception that it shows the presence of a significant amount of shunt conductance $G_x$ which simply is the reciprocal of the resistance appearing across $C_T$, which can be denoted as $R_x$. The wave form on line B in FIG. 3 is, again, the output of feedback amplifier 20 designated as $E_I$ in FIG. 1. The wave form shown on line C in FIG. 3 is the output $E_O$ of synchronous demodulator 21 when its input is the wave form shown on line B. Some actual numbers may be useful explaining the operation of the synchronous demodulator in the presence of some shunt resistance $R_x$ across the capacitor $C_T$ such as when a dielectric material such as M is about and between elements 11 and 13. If the drive voltage $E_D$ shown is assumed to be 6 volts, zero to peak, the feedback capacitance $C_f$ is 300 picofarads and the capacitance $C_t$ is 100 picofarads, the output voltage $E_I$ of feedback amplifier 20 is given as follows:

$E_I = E_D(C_t/C_f) = 6 \times 100/300 = 2$

From the above equation it can be seen that the output voltage $E_I$ of feedback amplifier 20 will be two volts.

The sloping lines of curves B and C in FIG. 3 are due to the integrating action of feedback amplifier 20 in the presence of resistance connecting it with a square wave source. The rate of change of voltage represented by the sloping lines or ramps with respect to time is simply the drive voltage $E_D$ divided by the time constant $R_xC_f$. In the illustration shown, each ramp moves through a change of 6 volts in about $0.5 \times 10^{-4}$ seconds. The shunt resistance can, therefore, be computed to be 167,000 ohms.

The remaining FIGS. of the drawings illustrate various applications of the apparatus and principles described with respect to FIGS. 1–3 and in which capacitor $C_T$ is replaced by a cell or probe and shunt conductance $G_x$ includes conductance caused by the proximity of a material being measured to the cell or probe. For example, capacitor $C_T$ may be a three-terminal cell which is filled with a grain for determination of the moisture content, and the dielectric constant of the grain (which is a function of its moisture content) and conductance of the grain will affect the feed through capacitance $C_t$ of the cell in the manner described.

FIG. 4 shows a tank 24 containing a liquid L and a probe 25 comprised of two long tubes or rods 26 and 27 extending from the top center of the tank to near the bottom of the tank. The two rods 26 and 27 may represent the two elements 11 and 13 of a three-terminal capacitor $C_T$ such as illustrated in FIG. 1, and the capacitance of probe 25 can be designated as $C_t$. Any conductance of the liquid between the probes would, again, correspond to $G_x$. With probe 25 connected into the circuit of FIG. 1, as the liquid in the tank rises the capacitive coupling between rods 26 and 27 will increase causing an increase in output signal $E_O$ from demodulator 21.

FIG. 5 is an enlarged view of a preferred form of probe 25 shown in FIG. 4. Rods 26 and 27 are insulated from each other in a spaced apart relationship by plastic insulators 28 (see FIG. 6) of which five are illustrated in FIG. 5. Connections to the driven and receptor elements of the probe are made through shielded cables in a circuit similar to that shown in FIG. 1, so that if rod 26 represents driven element 11, it would be connected to cable 16, and if rod 27 represents receptor 13, it would be connected to cable 18.

As illustrated in FIG. 5, each of rods 26 and 27 is mounted in an insulated block 29 which is in turn mounted in a shielded housing 30 comprising upper and lower shielding shrouds 30a and 30b, and a laterally extending flange member 31. Flange member 31 can be mounted by suitable bolts on the top of tank 24 and over an opening through which rods 26 and 27 can extend into the tank. The grounded shields on cables 16 and 18 are connected to a shielding partition 32 mounted in housing 30 to divide it into two shielded sections 33 and 34. Partition 32 is connected to shroud 30a and grounded along with shroud 30b, flange 31 and tank 24 so that rods 26 and 27 and the terminals and wires connecting them are completely shielded from each other except between the portions of rods 26 and 27 extending into tank 24 for contact with liquid L.

FIGS. 7 and 8 illustrate a preferred form of three-terminal probe 35 which may be inserted into a pipeline or dielectric constant cell by screwing it into suitable threaded opening. Probe 35 may also be connected in the circuit of FIG. 1 so that it would be represented by capacitance $C_t$ of capacitor $C_T$ in FIG. 1. Probe 35 includes two capacitive elements or plates 36 and 37, and if plate 36 represents driven element 11 of capacitor $C_T$ then it would be connected by cable 16 to drive source 15. Also, if plate 37 represents receptor element 13, then it would be connected to amplifier 20 by cable 18. Plates 36 and 37 are respectively connected to rods 38 and 39 extending through a plastic insulated mounting member 40. Plastic insulating member 40 is split in half by a conducting shield partition 41 to minimize all unwanted capacitance between the driven and receptor elements 36 and 37, except in the area of interest, and between connecting rods 38 and 39 and the terminals connected to cables 16 and 18. insulating member 40 is cylindrical and is mounted in a cylindrical, externally threaded conductive plug 42. A conductive shielded shroud 43 is mounted on top of plug 42 and is connected to partition 41 and to the grounded shield of cables 16 and 18, and a conductive shield plate 44 is mounted on the bottom of plug 42 but insulated from rods 38 and 39. Plug 41 is also grounded through its connection with shroud 43 and shield plate 44 is thus grounded. When probe 35 is mounted in a cell or pipeline, plates 36 and 38 are surrounded by a material whose dielectric constants, moisture content, or ingredients ratio is being determined, and, as noted, probe 35 may be used with circuits such as shown in FIG. 1 to make measurements of dielectric constant, moisture content, or ingredient mixture ratio of known ingredients of either liquid and solid materials.

FIG. 9 is a schematic diagram of a circuit similar to that shown in FIG. 1 (with capacitor $C_T$ replaced by a probe such as probe 35 of FIG. 7) wherein the output of synchronous demodulator 21 is coupled through a capacitor $C_c$ to two adjustable potentiometers 45 and 46. In this and the subsequent views, the grounded shield of the connecting cables are represented by the circle connected to ground about the line representing the center conductor of the cable. The output of potentiometer 45 is connected to a positive threshold detector 47 and the output of potentiometer 46 is connected to a negative threshold detector 48. Each of these threshold detectors produces an output signal when the input signal to them exceeds a certain threshold value of the appropriate polarity. Sudden positive or negative changes of the DC level of output signal $E_O$ coming out of synchronous demodulator 21 will thus be differentiated by capacitor $C_c$ to provide a positive or negative voltage pulse and when the peak voltage of this pulse exceeds the threshold value of detectors 47 and 48, depending on the polarity, one of detectors 47 and 48 will produce an output signal. In this application, probe 35, for example, may be screwed into a pipeline F containing products F' (illustrated by dots) which change from time to time. Petroleum product pipelines, for example, may pass gasoline for several hours and then switch to kerosene. It is quite important that the operator be able to detect the interface between the gasoline and kerosene the moment that it appears to prevent mixing. Although dielectric constants do change markedly with temperature, it is generally true that any known material being transmitted will have either a greater or a smaller dielectric constant than any other material which is following, even though the difference may be quite small. A properly adjusted and sensitive positive or negative threshold detector 47 or 48, therefore, can serve to detect the appearance of the interface even though the change in dielectric constant is small and occurs suddenly. FIG. 10 shows a wave form 49 such as would appear at the input of the positive threshold detector shown in FIG. 9 when the dielectric constant of the material in a pipeline suddenly changes. When the transient shown on wave form 49 exceeds the threshold set level 50, it causes the level detector 47 (since it is positive) to be tripped, giving notice that the interface has arrived at probe 35.

FIG. 11 illustrates a capacitive level control system for maintaining the level of material in a tank 51 at any desired level using probe 25 previously described and shown in FIG. 5. When the material in tank 51 rises to a point that increases the capacitive coupling between the driven and receptor elements 26 and 27 of the probe 25, it will cause an increase in the signal $E_I$ going into synchronous demodulator 21 and thus signal $E_O$ at the output of demodulator 21. A threshold detector 52 is connected to the output of synchronous demodulator 21 through threshold or level setting potentiometer P, and the coil of a relay 53 is connected to the output of detector 52. Threshold detector 52 responds to output signal $E_O$ when it exceeds a certain threshold level corresponding to a desired material level in the tank 51 to activate or open the contacts of relay 53. The contacts of relay 53 are normally closed and are connected between a source of power (not shown) and a normally closed solenoid valve 54 connected to control the flow of material into tank 51. Thus, detector 52 responds to the output of synchronous demodulator 21 and provides a signal to operate relay 52 causing its contacts to open and causing solenoid valve 54 to close when the output $E_O$ of demodulator 21 exceeds a certain level corresponding to when the level of material in tank 51 is at or near a desired level. When the material in tank 51 falls below this level, the feed through capacitive coupling of probe 25 will decrease, decreasing the output signal $E_O$ from demodulator 21 and causing threshold detector 52 to stop providing its output signal and allowing the contacts of relay 52 to close. When these relay contacts close, solenoid valve 54 opens allowing additional material to enter tank 51 and the process continues. The level setting potentiometer P is used to set the desired level in the tank. A different scale would be required for materials of different dielectric constant. The apparatus shown in FIG. 11 can be designed to work with materials which are very light and fluffy and have dielectric constants very close to that of air. With circuitry disclosed herein, it is possible to detect changes and feed through capacity of the probe as small as 0.001 picofarads in the presence of 1,000 or more picofarads of cable capacitance to ground.

Figure 12:
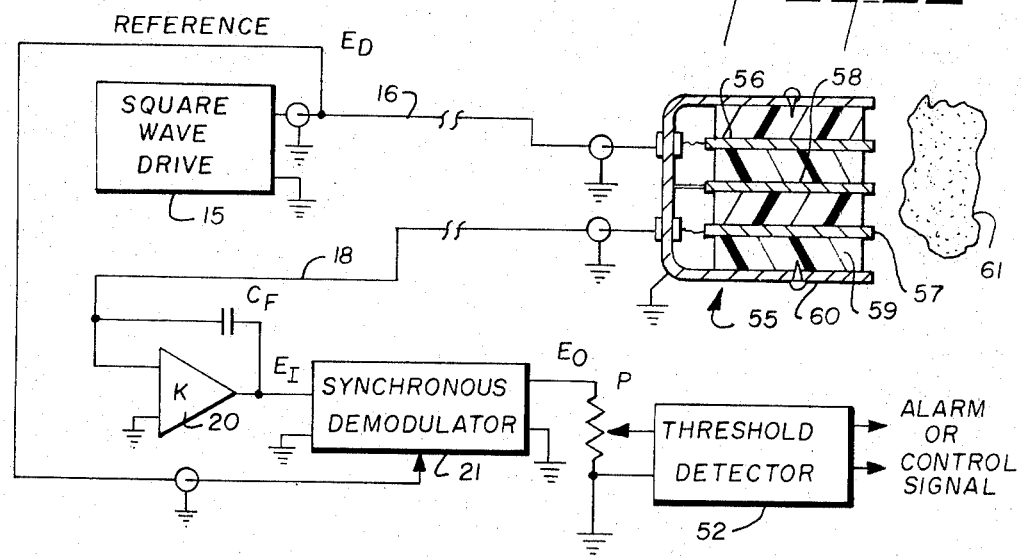
FIG. 12 is a schematic diagram of a three-terminal capacitor probe used as a proximity detector.
Figure 13B:
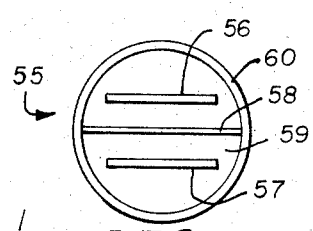
FIGS. 13A and 13B are end views of the probe of FIG. 12.
Figure 13A:
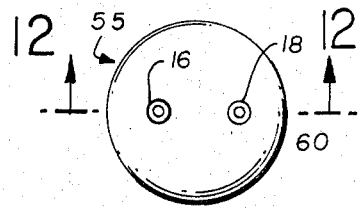

A proximity detector is shown in FIG. 12 as including a probe 55 which can be connected in the circuit of FIG. 1 and substituted for capacitor $C_T$ in FIG. 1. As in capacitor $C_T$ of FIG. 1, probe 55 includes a driven element 56 connected by cable 16 to square wave drive circuit 15, and a receptor element 57 connected by cable 18 to the input of integrating amplifier 20. The driven and receptor elements 56 and 57 in this case may be thin strips of metallic material separated by a wider strip 58 which serves as a shield and is grounded. These elements are molded into a block 59 of nonconducting plastic material and the block itself is enclosed in a conductive metal housing 60 which is maintained at ground potential. When an ungrounded object 61 of conductive material or any material with a dielectric constant greater than air comes near proximity detector probe 55, there is an increase in coupling between driven element 56 and receptor element 57. The increased coupling causes an increase in output of synchronous demodulator 21. The output of synchronous demodulator 21 is connected to the output of a threshold level detector 52 (such as described with respect to FIG. 11) and the increased output $E_O$ of demodulator 21 trips threshold detector producing an alarm or control signal.

In this embodiment as well as that of FIG. 11, a potentiometer P is placed between synchronous demodulator 21 and threshold detector 52 to permit an accurate setting of the desired threshold. In both embodiments, the probes 25 and 55 may be connected through many feet of cable to their associated electronics.

The apparatus described in FIG. 12 is capable of readily sensing capacitance changes of 0.001 picofarads in probe 55 in the presence of cable capacitances to ground of 1,000 picofarads. Although the dielectric constant of cable insulation changes substantially with temperature, in the above example, a change of only 1 percent would be 10 picofarads and would have little effect on the accuracy of the capacitance measurement made.

As used herein, the term "stray" capacitance broadly refers to the cable and the other stray capacitances between the capacitive element and ground as noted with respect to the description of FIG. 1.

In all of the embodiments described, the use of a stable, precisely regulated square wave drive signal makes possible both accurate measurement and the detection of very small changes in feed through capacitance of the three-terminal capacitor used. The affects of stray capacitance on the resulting output signal is effectively eliminated and the circuits described are insensitive to small changes in frequency. A high gain amplifier with an adequately large feedback capacitor is used to clamp the receptor element of the three-terminal capacitor and all conductors connecting to it to virtual ground. The higher the frequency of operation, the less likely is the circuit to be saturated from the effect of conductance between the driven and receptor elements. The practical upper frequency limit is determined by several factors including the output impedance of the square wave source, the gain, the rise time and the slew rate of the amplifier and the amplifier's output current capability. The higher the gain of the amplifier and the larger the feedback capacitor across it, the greater the tolerance of the circuit to cable capacitance and changes in cable capacitance. The effect of conductance between the driven and receptor elements is cancelled in the synchronous demodulator. Utilization of the combinations described make possible the application of capacitive techniques to many industrial applications which were heretofore impractical for the reasons previously discussed.

In certain applications, such as in level measurement and control, it may be desirable to form the capacitor $C_F$ of parallel plates or concentric cylinders immersed in material M to reduce the effect of changing dielectric constant with temperature, i.e., to make the ratio $C_t/C_f$ insensitive to temperature.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Three-terminal capacitive apparatus responsive to a condition of a material which causes changes in the feed through capacitance of the apparatus, so that such changes may be relatively accurately sensed or measured even in the presence of substantial amounts of stray capacitance, comprising, in combination: an electrically driven conductive element; a conductive receptor element; support means for supporting said driven and receptor elements spaced from and adjacent to each other and in the proximity of such material so that said condition affects the feed through capacitance of said capacitive apparatus; a source of square wave drive signals having a substantially constant peak amplitude with respect to circuit ground; first shielded conductive means connecting said source to said driven element to conduct said drive signals thereto, the output impedance of said source being such that any stray capacitance between said driven element and ground is rendered substantially ineffective with respect to said amplitude of said drive signals; a high gain amplifier including a capacitive feedback loop for maintaining said receptor element at virtual ground while providing an electrical output signal responsive to the feed through capacitance of said capacitive apparatus, and second shielded conductive means connecting said receptor element to said amplifier.

2. The apparatus of claim 1 wherein the presence of conductance of the material in proximity to said driven and receptor elements detrimentally affects the accuracy of determination of the feed through capacitance of said apparatus, and further including a synchronous demodulator connected to said amplifier and to said source of drive signals for demodulating the output signals from said amplifier in synchronism with said drive signals to substantially cancel out the effects of any such conductance present in said output signals.

3. The apparatus of claim 1 wherein the condition of said material is the level of such a material in a container and said driven and receptor elements comprise a level probe supported by said support means in such a container so that the feed through capacitance of the probe is responsive to a level of the material in the container.

4. The apparatus of claim 3 wherein said level probe is mounted in the top of a container and said driven and receptor elements extend from the top of the container to adjacent the bottom thereof whereby said feed through capacitance is responsive to the level of the material in the container throughout substantially all of the container.

5. The apparatus of claim 4 further including a threshold detector connected to said amplifier and providing an output signal when the output of said amplifier exceeds a predetermined level, valve means mounted in said container for permitting and stopping the flow of material into the container, and switch means connected to the output of said threshold detector and to said valve means and responsive to the output signal from said threshold detector to actuate said valve means.

6. The apparatus of claim 5 wherein said threshold detector includes means for varying said predetermined level.

7. The apparatus of claim 2 wherein the condition of said material is the level of such a material in a container and said driven and receptor elements comprise a level probe supported by said support means in such a container so that the feed through capacitance of the probe is responsive to a level of the material in the container.

8. The apparatus of claim 1 wherein said condition of said material is its proximity to a particular point, and wherein said driven and receptor elements comprise a probe supported by said support means at said point, wherein the approach of said material to said point produces detectable changes in the feed through capacitance of said probe, and further including means connected to said amplifier and responsive to when such changes in feed through capacitance exceed a predetermined amount to provide a control signal indicating the proximity of said material to said point.

9. The apparatus of claim 2 wherein said condition of said material is its proximity to a particular point, and wherein said driven and receptor elements comprise a probe supported by said support means at said point, wherein the approach of said material to said point produces detectable changes in the feed through capacitance of said probe, and further including means connected to said amplifier and responsive to when such changes in feed through capacitance exceed a predetermined amount to provide a control signal indicating the proximity of said material to said point.

10. The apparatus of claim 1 wherein said condition is the change in dielectric constant of said material, and further including means for providing an output signal in response to the rate of said change.

11. The apparatus of claim 10 wherein said last mentioned means includes at least one threshold detector responding to said output signal when it exceeds a predetermined level to provide a control signal, and a capacitor connected between the output of said output circuit and said threshold detector.

12. The apparatus of claim 2 wherein said condition is the change in dielectric constant of said material, and further including means for providing an output signal in response to the rate of said change.

13. The apparatus of claim 1 wherein said support means supports said driven and receptor elements in a dielectric cell and the condition of said material is the dielectric constant of said material which is proportional to the moisture content or ingredients ratio of the material.

14. The apparatus of claim 2 wherein said support means supports said driven and receptor elements in a dielectric cell and the condition of said material is the dielectric constant of said material which is proportional to the moisture content or ingredients ratio of the material.

* * * * *